(12) United States Patent
Otani

(10) Patent No.: US 11,704,296 B2
(45) Date of Patent: Jul. 18, 2023

(54) DATA MANAGEMENT SYSTEM, DATA MANAGEMENT APPARATUS, AND NON-TRANSITORY COMPUTER READABLE MEDIUM STORING DATA MANAGEMENT PROGRAM

(71) Applicant: FUJIFILM Business Innovation Corp., Tokyo (JP)

(72) Inventor: Shintaro Otani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 392 days.

(21) Appl. No.: 16/891,077

(22) Filed: Jun. 3, 2020

(65) Prior Publication Data

US 2021/0149861 A1 May 20, 2021

(30) Foreign Application Priority Data

Nov. 15, 2019 (JP) .................................. 2019-207186

(51) Int. Cl.
*G06F 16/00* (2019.01)
*G06F 16/22* (2019.01)

(52) U.S. Cl.
CPC ................................ *G06F 16/2255* (2019.01)

(58) Field of Classification Search
CPC .. G06F 16/2255; G06F 21/6272; G06F 16/93; G06F 21/64
See application file for complete search history.

(56) References Cited

U.S. PATENT DOCUMENTS

| 7,117,504 | B2* | 10/2006 | Smith | G06F 8/20 |
| | | | | 709/227 |
| 7,546,602 | B2* | 6/2009 | Hejlsberg | G06F 9/54 |
| | | | | 717/114 |
| 7,734,598 | B2* | 6/2010 | Noguchi | G11B 20/00086 |
| | | | | 713/168 |
| 8,824,025 | B2* | 9/2014 | Mochizuki | G06V 10/242 |
| | | | | 358/488 |
| 8,943,091 | B2* | 1/2015 | Pantaleoni | G16B 30/00 |
| | | | | 707/706 |
| 10,657,132 | B2* | 5/2020 | Rogynskyy | G06F 16/285 |
| 11,316,900 | B1* | 4/2022 | Schottland | H04L 63/0263 |
| 2005/0240943 | A1* | 10/2005 | Smith | G06F 3/00 |
| | | | | 719/328 |

(Continued)

FOREIGN PATENT DOCUMENTS

JP 2014037068 2/2014
JP 2014102791 6/2014

*Primary Examiner* — Noosha Arjomandi
(74) *Attorney, Agent, or Firm* — JCIPRNET

(57) ABSTRACT

A data management system includes a management apparatus including a processor, and plural storage devices. The processor is configured to generate hash values corresponding to data to be managed according to a predetermined calculation rule, the plural storage devices stores first hash values that are hash values generated by the processor at a first point in time, and the processor is configured to perform determination of invariance related to the plural first hash values or the data by comparing sets including the plural of first hash values read out from the plural storage devices and second hash values that are hash values regenerated according to the calculation rule at a second point in time later than the first point in time.

14 Claims, 11 Drawing Sheets

(56) References Cited

U.S. PATENT DOCUMENTS

| | | | |
|---|---|---|---|
| 2007/0164882 A1* | 7/2007 | Monro | G06F 16/93 341/51 |
| 2008/0177799 A1* | 7/2008 | Wilson | H04N 1/32133 |
| 2014/0122509 A1* | 5/2014 | Pantaleoni | G06F 16/43 707/754 |
| 2014/0207910 A1* | 7/2014 | Wischhof | H04L 67/06 709/217 |
| 2016/0139819 A1* | 5/2016 | Kataoka | H03M 7/3088 711/154 |
| 2019/0379899 A1* | 12/2019 | Sugahara | G06T 1/0085 |
| 2020/0356547 A1* | 11/2020 | Furukawa | G06F 16/2379 |
| 2020/0394230 A1* | 12/2020 | Urankar | G06F 12/0802 |
| 2021/0149861 A1* | 5/2021 | Otani | G06F 16/2255 |

* cited by examiner

| DOCUMENT ID | REGISTRATION POINT IN TIME | FILE NAME | PERMITTED USER | STORAGE DESTINATION | ACCESS INFORMATION | HASH VALUE |
|---|---|---|---|---|---|---|
| C0002 | 03/02/2018 | File02 | A, B | ON-PREMISES | x x x x | f7f827480340c54ac08395 9521a40a92 |
| C0003 | 03/03/2018 | File03 | A, B, C | ON-PREMISES | x x x x | 32ad4311a007842742d21 73ec744cc8c |
| ⋮ | ⋮ | ⋮ | ⋮ | ⋮ | ⋮ | ⋮ |

| DOCUMENT ID | REGISTRATION POINT IN TIME | FILE NAME | PERMITTED USER | STORAGE DESTINATION | ACCESS INFORMATION | HASH VALUE |
|---|---|---|---|---|---|---|
| C0001 | 03/01/2018 | File01 | A | CLOUD | x x x x | NULL |
| C0002 | 03/02/2018 | File02 | A, B | ON-PREMISES | x x x x | f7f827480340c54ac08395 9521a40a92 |
| C0003 | 03/03/2018 | File03 | A, B, C | ON-PREMISES | x x x x | 32ad4311a007842742d21 73ec744cc8c |
| ⋮ | ⋮ | ⋮ | ⋮ | ⋮ | ⋮ | ⋮ |

FIG. 5

| USER ID | USER NAME | MAIL ADDRESS | PASSWORD | AFFILIATION GROUP | REGISTRATION DATE AND TIME |
|---|---|---|---|---|---|
| U0001 | A | userA@yyy.co.jp | qwertyui | xxx | 03/01/2018 |
| U0002 | B | userB@yyy.co.jp | lkjhgfds | xxx | 03/01/2018 |
| U0003 | C | userC@yyy.co.jp | zxcvbnm | xxx | 03/02/2018 |
| ... | ... | ... | ... | ... | ... |

67

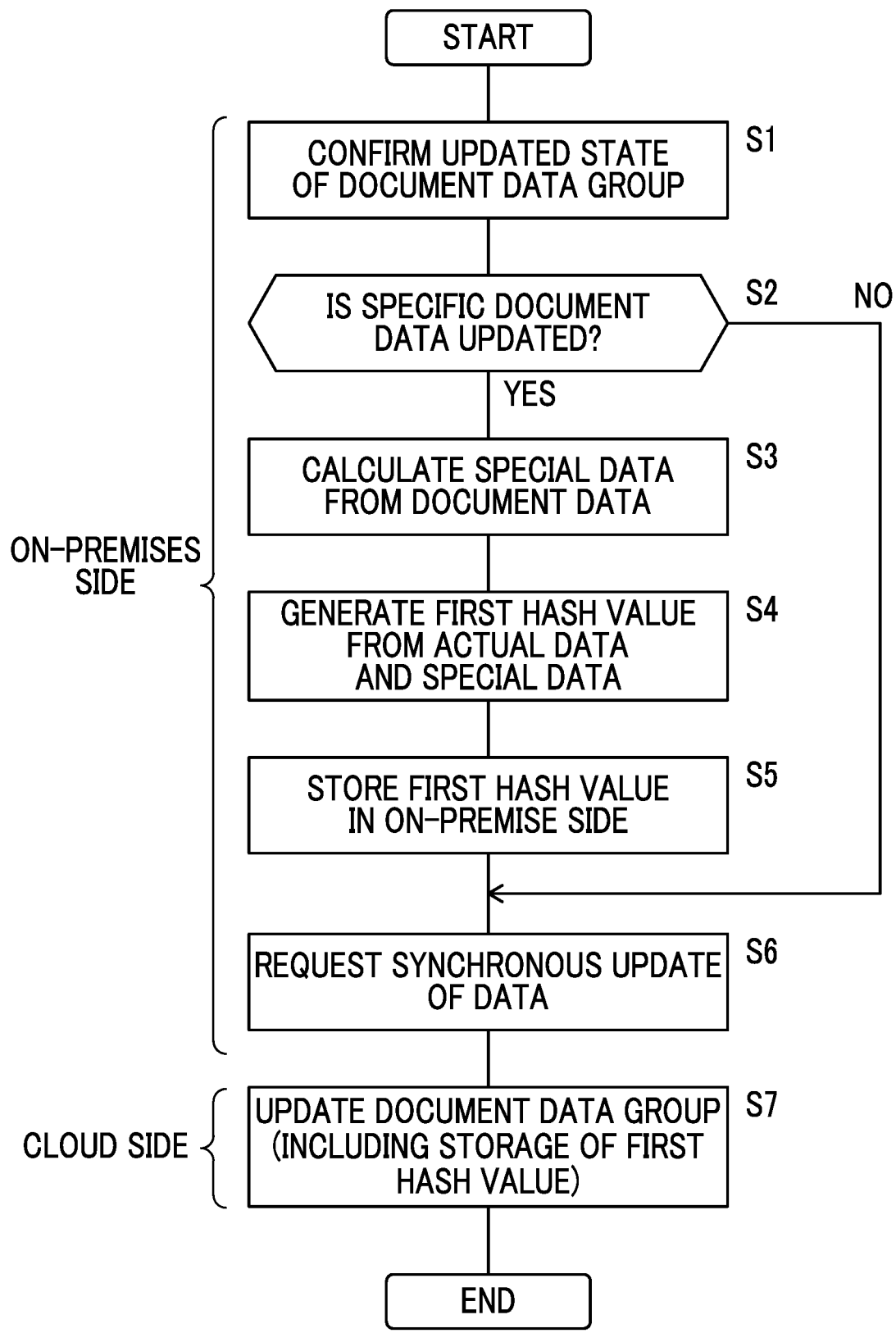

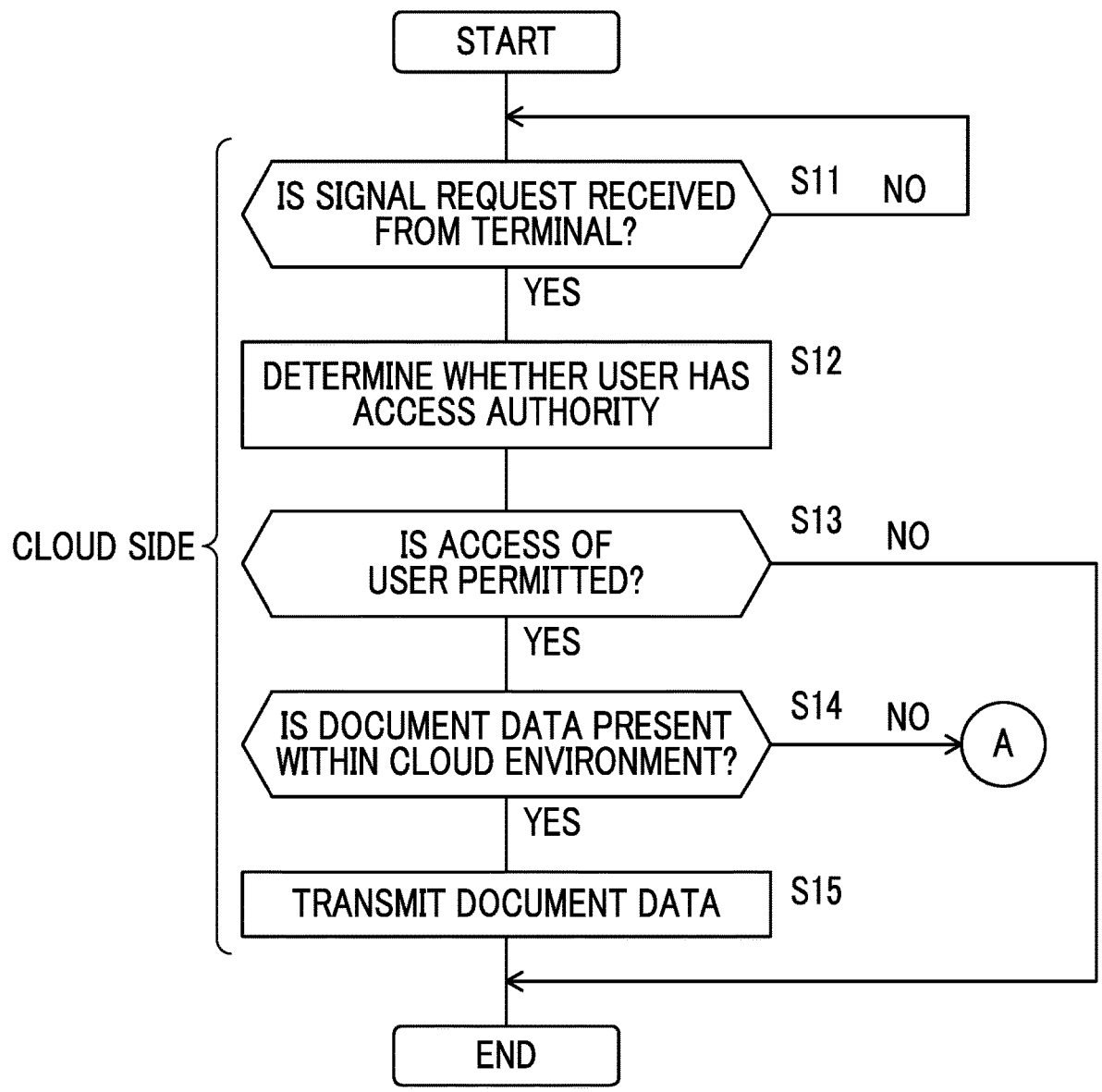

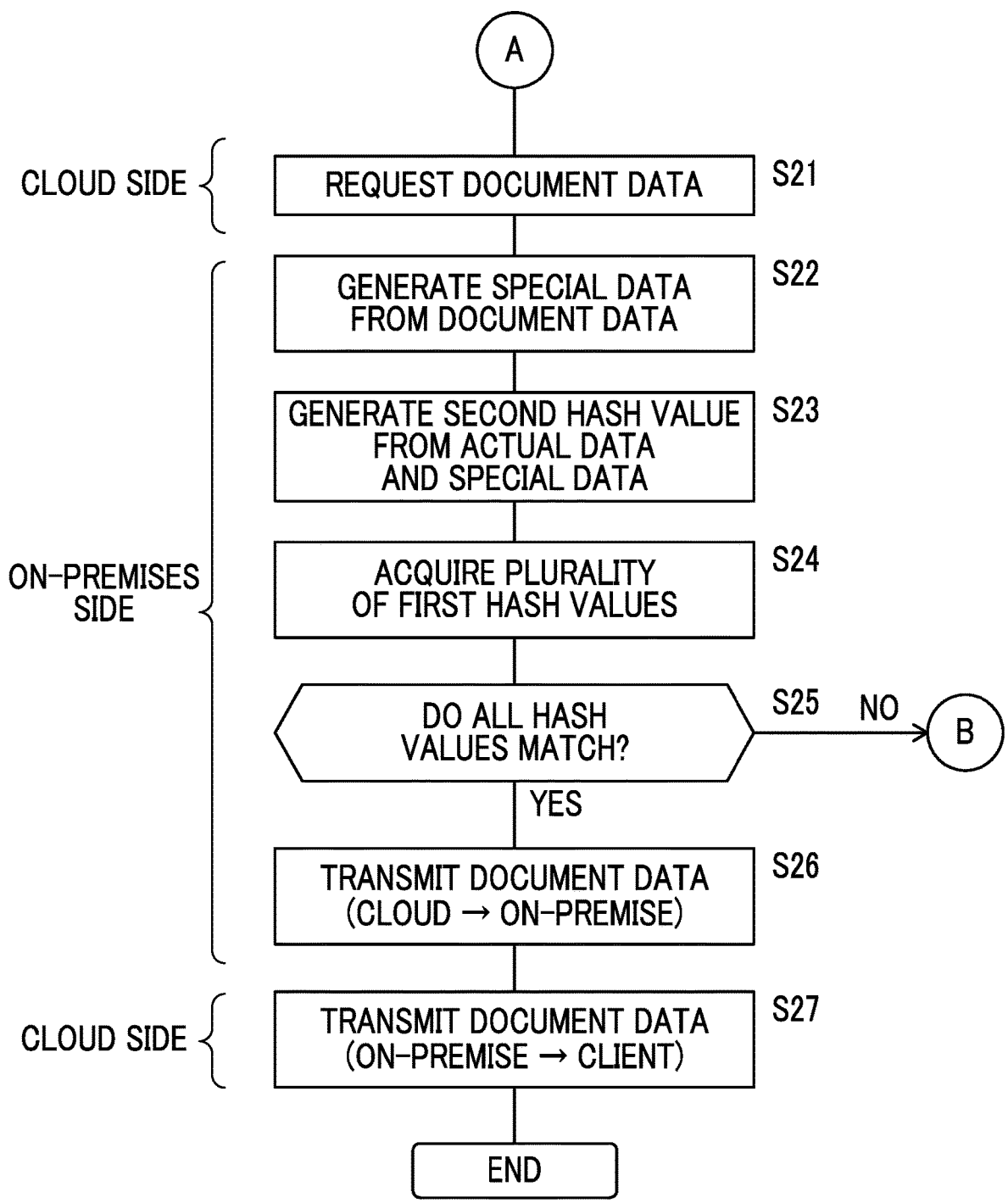

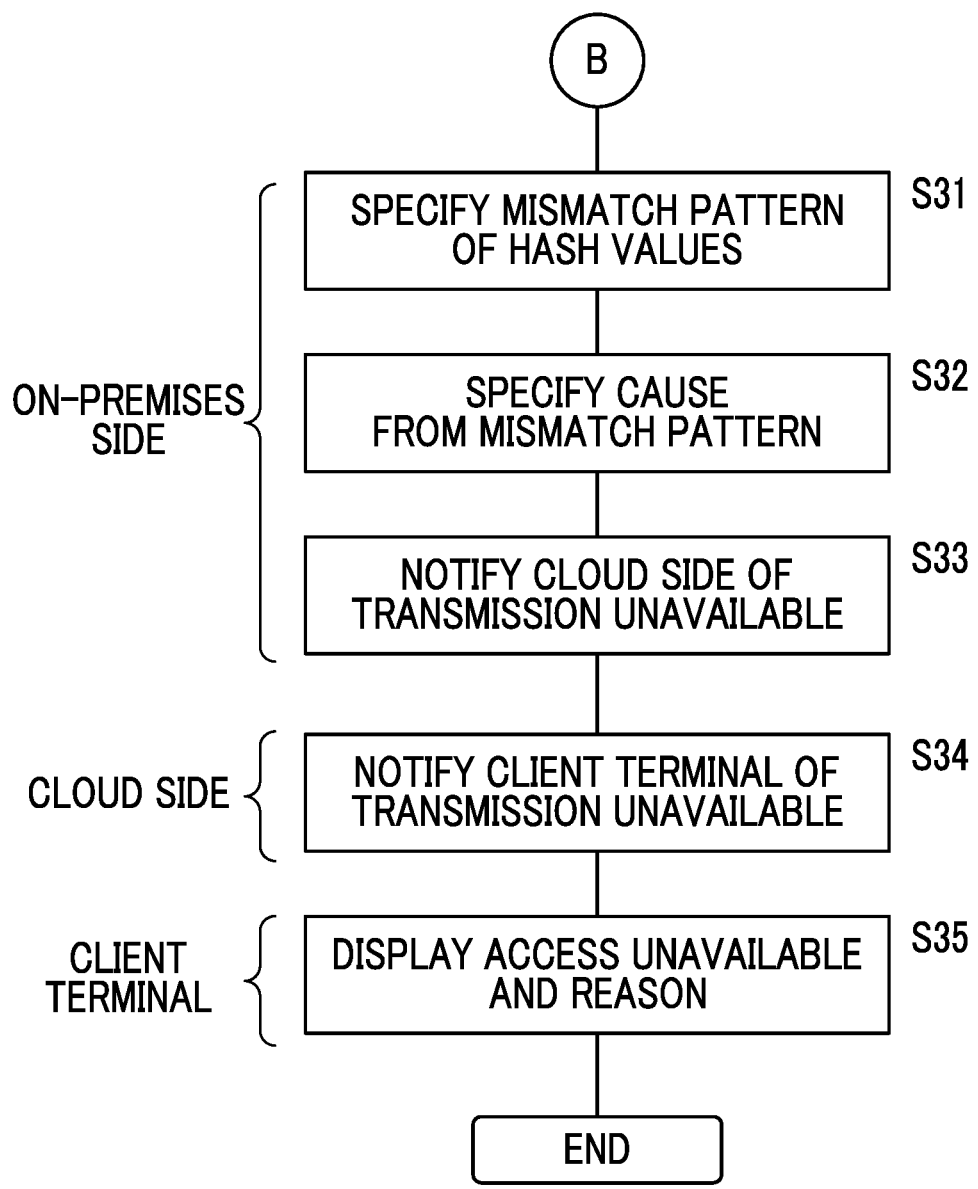

FIG. 10

| FIRST HASH VALUE H01 ON ON-PREMISE SIDE | FIRST HASH VALUE HC1 ON CLOUD SIDE | SECOND HASH VALUE H02 ON ON-PREMISES SIDE | CAUSE |
|---|---|---|---|
| MATCH | MATCH | MATCH | NONE (NORMAL) |
| MISMATCH | MATCH | MATCH | FALSIFICATION OR DAMAGE OF HASH VALUE ON ON-PREMISES SIDE |
| MATCH | MISMATCH | MATCH | FALSIFICATION OR DAMAGE OF HASH VALUE ON CLOUD SIDE |
| MATCH | MATCH | MISMATCH | FALSIFICATION OR DAMAGE OF DOCUMENT DATA ON ON-PREMISES SIDE |
| MISMATCH | MISMATCH | MISMATCH | UNKNOWN (ABNORMALITY) |

DATA MANAGEMENT SYSTEM, DATA MANAGEMENT APPARATUS, AND NON-TRANSITORY COMPUTER READABLE MEDIUM STORING DATA MANAGEMENT PROGRAM

CROSS-REFERENCE TO RELATED APPLICATIONS

This application is based on and claims priority under 35 USC 119 from Japanese Patent Application No. 2019-207186 filed Nov. 15, 2019.

BACKGROUND

(i) Technical Field

The present invention relates to a data management system, a data management apparatus, and a non-transitory computer readable medium storing a data management program.

(ii) Related Art

JP2014-037068A discloses an image processing apparatus that determines whether or not a page image of print data is normal by calculating hash values of the page image and comparing the calculated hash values with normal hash values stored in a storage unit.

JP2014-102791A discloses an image processing apparatus that deletes one or more pieces of accessory information included in a data file according to a processing content and a security state of a request destination and then requests processing of the data file.

SUMMARY

However, in a case where the hash value stored in the storage device is read out and is used as a comparison value and invariance of the hash value is impaired due to falsification or damage, since both the hash values do not match, there is a possibility that invariance of data to be managed is erroneously determined to be impaired.

Aspects of non-limiting embodiments of the present disclosure relate to a data management system, a data management apparatus, and a non-transitory computer-readable medium storing data management program that erroneous determination related to invariance of data to be managed is suppressed in a case where a hash value stored in a storage device is read and is used as a comparison value and invariance of the hash value is impaired.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a data management system including a management apparatus including a processor, and a plurality of storage devices. The processor is configured to generate hash values corresponding to data to be managed according to a predetermined calculation rule, the plurality of storage devices stores first hash values that are hash values generated by the processor at a first point in time, and the processor is configured to perform determination of invariance related to the plurality of first hash values or the data by comparing sets including the plurality of first hash values readout from the plurality of storage devices and second hash values that are hash values regenerated according to the calculation rule at a second point in time later than the first point in time.

BRIEF DESCRIPTION OF THE DRAWINGS

Exemplary embodiment(s) of the present invention will be described in detail based on the following figures, wherein:

FIGS. 4A and 4B are diagrams showing examples of data structures of document management tables included in document information DBs of FIGS. 2 and 3;

FIG. 5 is a diagram showing an example of a data structure of a resource management table included in a resource information DB of FIG. 3;

FIG. 6 is a flowchart showing an operation of the data management system at the time of synchronous update of data;

FIG. 7 is a flowchart showing an operation of the data management system at the time of providing cloud side data;

FIG. 8 is a flowchart showing an operation of the data management system at the time of providing on-premises side data;

FIG. 9 is a flowchart showing an operation of the data management system in a case where invariance of a hash value or data is impaired;

FIG. 10 is a diagram showing an example of a determination rule used by an invariance determination unit of FIG. 2;

DETAILED DESCRIPTION

An exemplary embodiment of a data management system according to the present invention will be described in relation to a data management apparatus and a data management program with reference to the accompanying drawings.

Configuration of Data Management System 10

Figure 1:
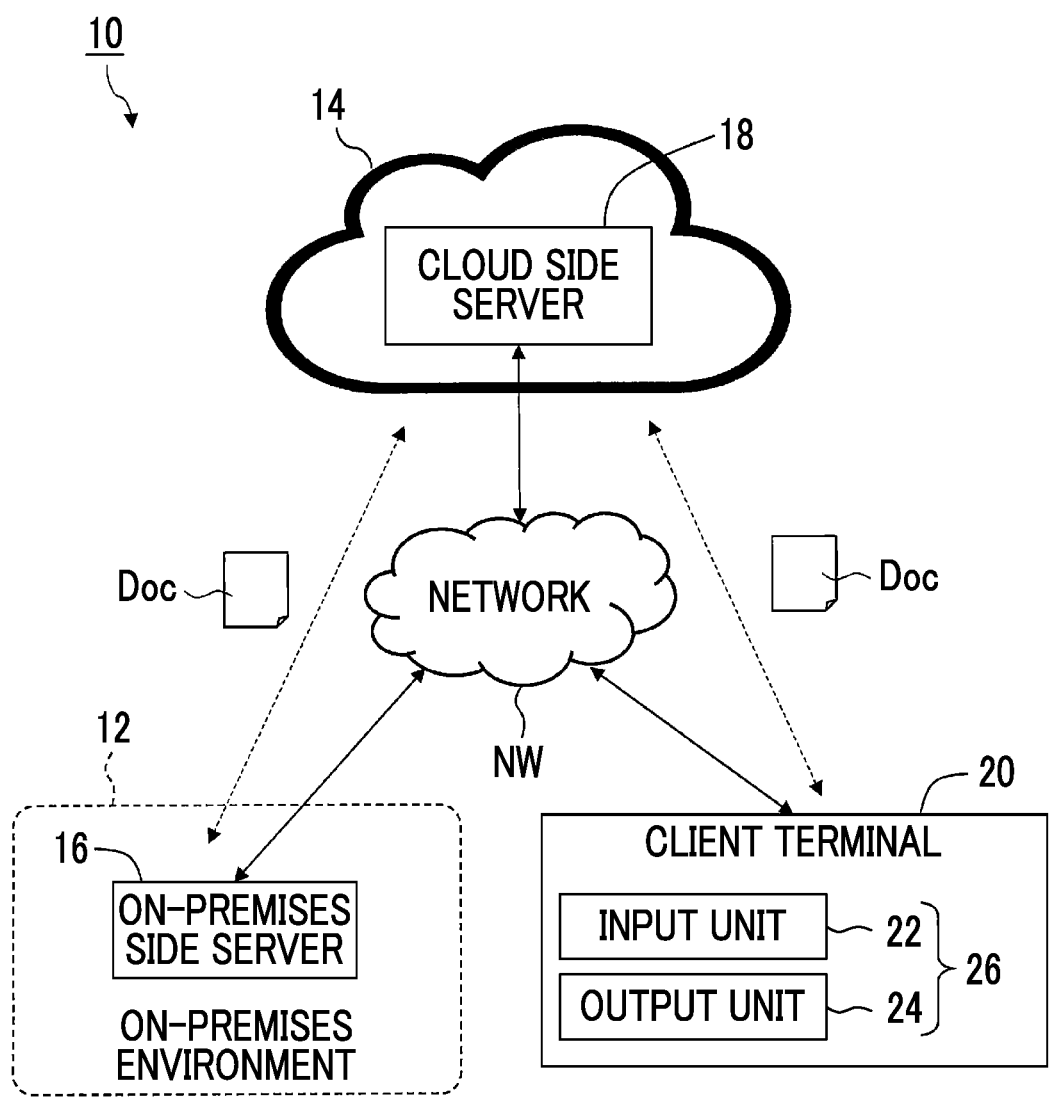
FIG. 1 is an overall configuration diagram of a data management system according to an exemplary embodiment of the present invention.

FIG. 1 is an overall configuration diagram of a data management system 10 according to an exemplary embodiment of the present invention. The data management system 10 is configured to provide a so-called "hybrid" document management service that manages document data Doc across an on-premises environment 12 and a cloud environment 14. In this exemplary embodiment, a case where data to be managed is an electronic document is used as an example. However, this management service may be applied to data in various formats such as moving image data, still image data, and audio data in addition to the electronic document.

The data management system 10 includes an on-premises side server 16 provided within the on-premises environment 12, a cloud side server 18 provided within the cloud environment 14, and at least one client terminal 20.

The on-premises side server 16 is a computer that performs overall control of the document data Doc within the on-premises environment 12. Here, the on-premises side server 16 is shown as a single computer, but instead, the on-premises side server 16 may be a group of computers constructing a distributed system.

The cloud side server 18 is a computer that performs overall control of the document data Doc within the cloud environment 14. Here, the cloud side server 18 is shown as a single computer, but instead, the cloud side server 18 may be a group of computers constructing a distributed system.

The client terminal 20 is a computer capable of bidirectionally communicating with an external device, and is configured to include, for example, a tablet, a smartphone, a personal computer, and a wearable device. The client terminal 20 includes an input unit 22 and an output unit 24. The input unit 22 includes an input device including a mouse, a keyboard, a touch sensor, or a microphone. The output unit 24 includes an output device including a display and a speaker. The client terminal 20 realizes a user interface 26 by combining an input function of the input unit 22 and an output function of the output unit 24.

Incidentally, the on-premises environment 12 is a network environment in which restrictions are prepared so as not to be freely accessed from an external network NW. Meanwhile, the cloud environment 14 is a network environment that can be accessed by unspecified users. For example, the client terminal 20 outside the on-premises environment 12 can acquire the document data Doc managed by the on-premises side server 16 by using the cloud side server 18 as a contact.

Figure 2:
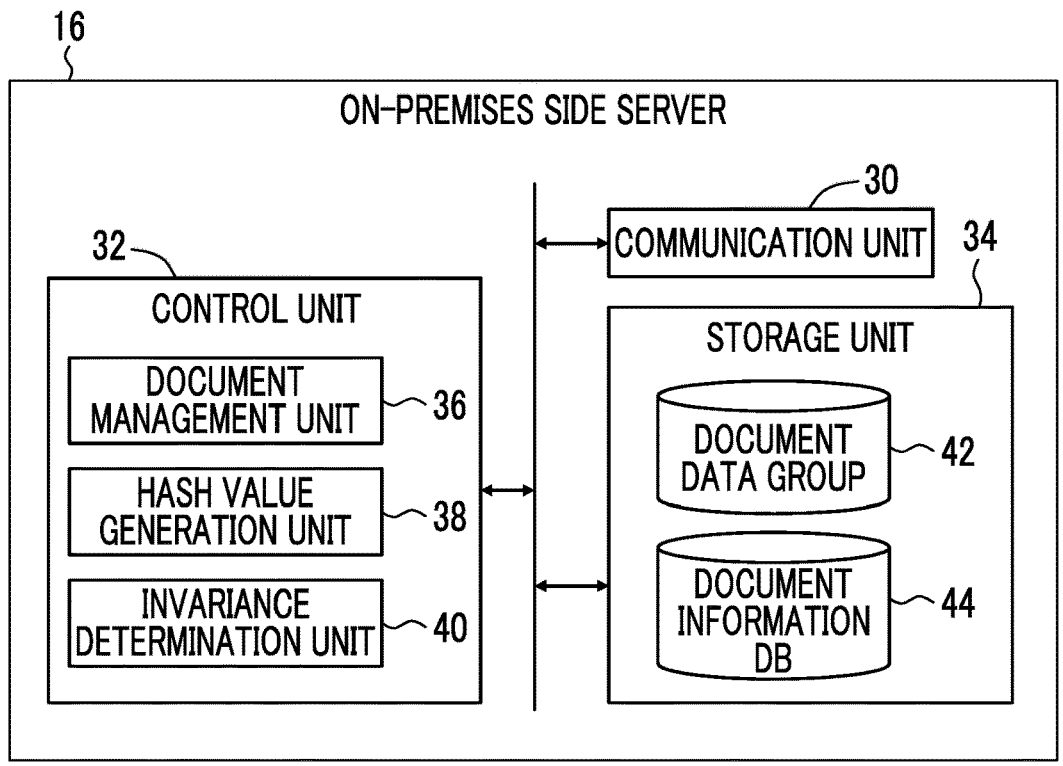
FIG. 2 is a block diagram of an on-premises side server shown in FIG. 1.

FIG. 2 is a block diagram of the on-premises side server shown in FIG. 1. The on-premises side server 16 is configured to include a communication unit 30, a control unit 32, and a storage unit 34.

The communication unit 30 is a communication interface for transmitting and receiving electric signals to and from an external device. Accordingly, the on-premises side server 16 can exchange various data with the cloud side server 18 via a network NW.

The control unit 32 is configured to include a processor including a central processing unit (CPU) and a graphics processing unit (GPU). The control unit 32 functions as a document management unit 36, a hash value generation unit 38, and an invariance determination unit 40 by reading out and executing a document management program stored in the storage unit 34.

The storage unit 34 is configured by a non-transitory computer-readable storage medium. Here, the computer-readable storage medium is a storage device including a hard disk drive (HDD) and a solid state drive (SSD), or a portable medium such as a magneto-optical disk, a ROM, a CD-ROM, and a flash memory. In the example of this diagram, the storage unit 34 stores a document data group 42, and a database (hereinafter, referred to as a "document information DB 44") related to information on documents is constructed.

Figure 3:
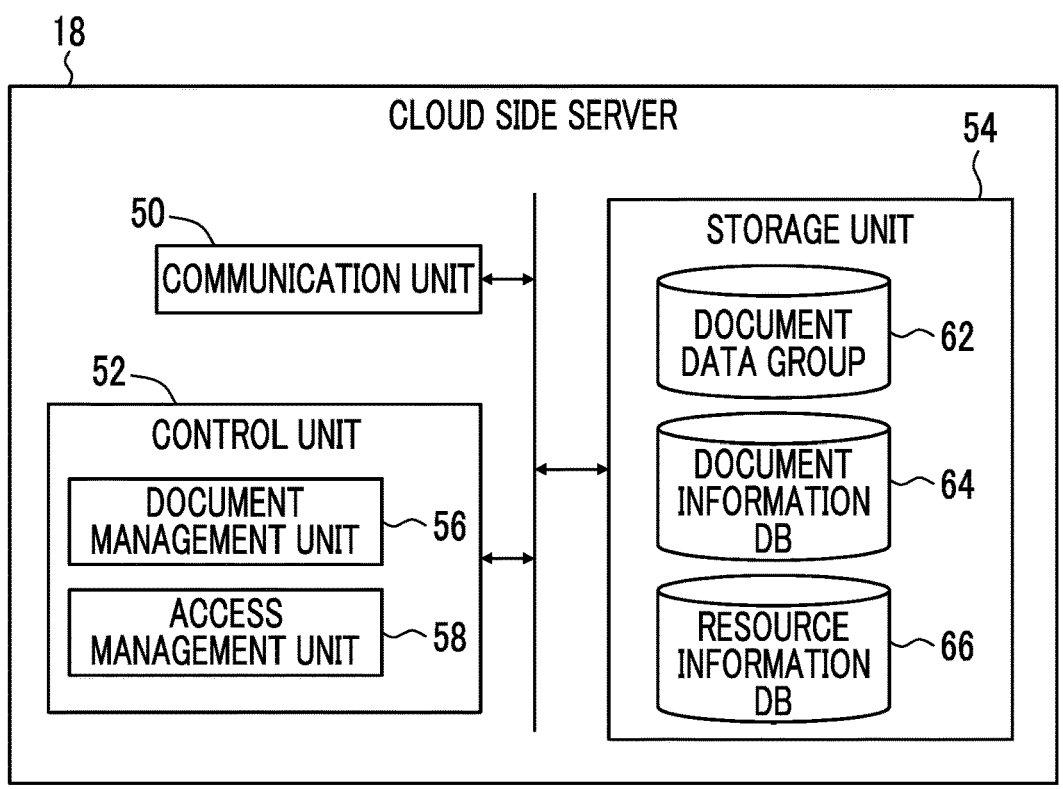
FIG. 3 is a block diagram of a cloud side server shown in FIG. 1.

FIG. 3 is a block diagram of the cloud side server 18 shown in FIG. 1. The cloud side server 18 is configured to include a communication unit 50, a control unit 52, and a storage unit 54.

The communication unit 50 is a communication interface having the same configuration as the configuration of the communication unit 30 of FIG. 2. Accordingly, the cloud side server 18 can exchange various data with the on-premises side server 16 or the client terminal 20 via the network NW.

The control unit 52 is configured to include a processor including a CPU and a GPU similarly to the control unit 32 of FIG. 2. The control unit 52 functions as a document management unit 56 and an access management unit 58 by reading out and executing a document management program stored in the storage unit 54.

The storage unit 54 is configured to include a non-transitory computer-readable storage medium. In the example of this diagram, the storage unit 54 stores a document data group 62, and a database (hereinafter, referred to as a "document information DB 64") related to information on documents and a database (hereinafter, referred to as a "resource information DB 66") related to information on resources are constructed.

FIGS. 4A and 4B are diagrams showing examples of data structures of document management tables 45 and 65 included in the document information DBs 44 and 64 of FIGS. 2 and 3. More specifically, FIG. 4A shows the document management table 45 included in the document information DB 44 of FIG. 2, and FIG. 4B shows the document management table 65 included in the document information DB 64 of FIG. 3.

Each of the document management tables 45 and 65 is information indicating a correspondence between a "document ID" that is identification information of the document data Doc, a "registration date and time" indicating a registration point in time of the document data Doc, a "file name" indicating a name of the document data Doc, a "permitted user" indicating a user name permitted to access the document data Doc, a "storage destination" indicating a storage location of the document data Doc, "access information" indicating network information for the on-premises side server 16 to access the cloud side server 18, and a "hash value" generated from the document data Doc.

Specifically, any one of [1] "on-premises" indicating a state of being stored only in the on-premises side server 16, [2] "cloud" indicating a state of being stored only in the cloud side server 18, and [3] "both" indicating a state of being stored in both the on-premises side server 16 and the cloud side server 18 is selected as the "storage destination".

FIG. 5 is a diagram showing an example of a data structure of a resource management table 67 included in the resource information DB 66 of FIG. 3. The resource management table 67 is information indicating a correspondence between a "user ID" that is identification information of the user, a "user name" indicating the name of the user, a "mail address" indicating a transmission destination of the document data Doc, a "password" for authenticating the user, an "affiliation group" indicating an affiliation of the user, and a "registration date and time" indicating a registration point in time of the user.

Operation of Data Management System 10

The data management system 10 according to this exemplary embodiment is configured as described above. Subsequently, various operations of the data management system 10 will be described while primarily referring to flowcharts of FIGS. 6 to 9.

First Operation: Synchronous Update of Data

First, "synchronous update of data" that is a first operation of the data management system 10 will be described with reference to the flowchart of FIG. 6. This synchronous update is achieved by simultaneously performing [1] update processing for reflecting updated data in the on-premises environment 12 into the cloud environment 14 and [2]

update processing for reflecting updated data in the cloud environment 14 into the on-premises environment 12. Here, only the former update processing will be described. Steps S1 to S6 of FIG. 6 are executed by the on-premises side server 16, and step S7 is executed by the cloud side server 18.

In step S1 of FIG. 6, the control unit 32 (more specifically, the document management unit 36) of the on-premises side server 16 confirms an updated state of the document data group 42. Specifically, the document management unit 36 confirms whether or not the document data group 42 is updated and the contents by comparing the document management table 45 at a point in time of the previous update with the document management table 45 at a point in time of the current update.

In step S2, the document management unit 36 confirms whether or not an update (specifically, addition or change) related to a specific document data Doc is executed while referring to the confirmation result in step S1. As an example of the specific document data Doc, there is data including information highly confidential to an organization using the on-premises environment 12 or members thereof. In a case where the specific document data Doc is not updated (step S2: NO), the execution of steps S3 to S5 is omitted, and the processing proceeds to step S6 to be described below. Meanwhile, in a case where the specific document data Doc is updated (step S2: YES), the processing proceeds to the next step S3.

In step S3, the control unit 32 (more specifically, the hash value generation unit 38) extracts at least one piece of attribute information specific to the specific document data Doc, and generates special data by using a function having this attribute information as an argument. This attribute information is accessory information different from actual data of the document, and may be various information including, for example, a file name, an extension, an update point in time, and a creator. This special data is deleted after the hash value is generated from the viewpoint of preventing falsification.

In step S4, the hash value generation unit 38 generates the hash value corresponding to the document data Doc from the combination of the actual data and the special data according to a predetermined calculation rule. This calculation rule may be a rule based on various hash functions including MD5, SHA-1, and SHA-256. Hereinafter, the hash value generated at a first point in time in response to the synchronous update of the data is referred to as a "first hash value".

In step S5, the hash value generation unit 38 stores the first hash value generated in step S4 in the storage unit 34 of the on-premises side server 16. Specifically, the "hash value" corresponding to the corresponding "document ID" is stored in the document management table 45 of FIG. 4A.

In step S6, the control unit 32 of the on-premises side server 16 requests the cloud side server 18 to perform the synchronous update of the data. Specifically, the on-premises side server 16 transmits data including the document data Doc to be updated and the document management table 45 to the cloud side server 18. In a case where steps S3 to S5 are executed, the first hash value included in the document management table 45 is also transmitted.

In step S7, the control unit 52 (more specifically, the document management unit 56) of the cloud side server 18 updates various databases in response to the synchronous update requested in step S6. Specifically, the document management unit 56 updates the document data group 62 by using the document data Doc received from the on-premises side server 16, and updates the document information DB 64 by using the document management table 45 received from the on-premises side server 16. Here, it should be noted that, in a case where the first hash value is newly added to the document management table 45, the first hash value is stored in the storage unit 34 through the update of the document management table 65. Thus, the first operation of the data management system 10 ends.

Second Operation: Provision of Cloud Side Data

Subsequently, "provision of cloud side data" that is a second operation of the data management system 10 will be described with reference to the flowchart in FIG. 7. Steps S11 to S15 of FIG. 7 are all executed by the cloud side server 18.

In step S11 of FIG. 7, the control unit 52 (more specifically, the access management unit 58) of the cloud side server 18 confirms whether or not a request signal for requesting access to the document data Doc is received from the client terminal 20. Here, the "access" means a state in which the user can use the document data Doc, and may refer, for example, that the client terminal 20 acquires the document data Doc or that the connection between the client terminal 20 and the device retaining the document data Doc is permitted.

Prior to this confirmation, the user performs a request operation including designation of the document data Doc to be requested and authentication of the user via the user interface 26 of the client terminal 20. By doing this, the client terminal 20 generates a request signal including access request information such as a user name, a file name, a mail address, and a password, and transmits this request signal to the cloud side server 18.

In a case where the cloud side server 18 does not receive the request signal from the client terminal 20 yet (step S11: NO), the processing stays in step S11 until this request signal is received. Meanwhile, in a case where the cloud side server 18 receives this request signal (step S11: YES), the processing proceeds to the next step S12.

In step S12, the access management unit 58 determines whether or not the user who performs the request operation on the client terminal 20 has access authority by using the access request information specified from the request signal received in step S11. More specifically, the access management unit 58 reads out the document management table 65 from the document information DB 64 by collating the file name, and reads out the resource management table 67 from the resource information DB 66 by collating the permitted user (that is, the user name). In a case where an input value and a setting value of the mail address match and an input value and a setting value of the password match, the access management unit 58 determines that the user has the access authority.

In step S13, the access management unit 58 decides whether or not to permit the access to the document data Doc. In a case where this access is not permitted (step S13: NO), the execution of steps S14 and S15 is omitted, and the flowchart of FIG. 7 ends. Meanwhile, in a case where this access is permitted (step S13: YES), the processing proceeds to the next step S14.

In step S14, the control unit 52 (more specifically, the document management unit 56) of the cloud side server 18 confirms whether or not the document data Doc to be requested is present within the cloud environment 14. Specifically, in a case where the corresponding storage destination within the document management table 65 is "on-premises", the document management unit 56 determines that the document data is not present within the cloud environment 14 (step S14: NO), and the processing proceeds to step S22 of FIG. 8 to be described below. Meanwhile, in a case where the corresponding storage destination is either "cloud" or "both", the document management unit 56 determines that the document data is present within the cloud environment 14 (step S14: YES), and the processing proceeds to the next step S15.

In step S15, after the document data Doc to be requested is read out from the document data group 62, the document management unit 56 performs control for designating the client terminal 20 as the transmission destination and transmitting the document data Doc. By doing this, the client terminal 20 receives the document data Doc from the cloud side server 18 via the network NW.

Thus, the second operation of the data management system 10 ends, and the document data Doc within the cloud environment 14 is provided to the user. Meanwhile, in a case where intended document data Doc is present within the on-premises environment 12, the cloud side server 18 needs to acquire the document data Doc to be provided to the client terminal 20 from the on-premises side server 16 in advance.

Third Operation: Provision of On-Premises Side Data

Next, "provision of on-premises side data" that is a third operation of the data management system will be described with reference to the flowcharts of FIGS. 8 and 9. Steps S21 and S27 of FIG. 8 are executed by the cloud side server 18, and steps S22 to S26 are executed by the on-premises side server 16.

In step S21 of FIG. 8, the cloud side server 18 requests the on-premises side server 16 to transmit the document data Doc. Specifically, the cloud side server 18 transmits a request signal including management information of the document data Doc present within the document management table to the on-premises side server 16. The management information includes various information for generating the special data in addition to the document ID, the user ID, and the hash value.

In step S22, after the request signal transmitted in step S21 is received, the control unit 32 (more specifically, the hash value generation unit 38) of the on-premises side server 16 specifies the document data Doc to be requested from the document ID included in the acquired management information, and generates the special data by using a function identical to the function in step S3 of FIG. 6.

In step S23, the hash value generation unit 38 generates the hash value corresponding to the document data Doc from the combination of the actual data and the special data according to a calculation rule identical to the calculation rule in step S4 of FIG. 6. Hereinafter, the hash values generated at a second point in time in response to the request for the document data Doc is referred to as "second hash values". The second point in time corresponds to a point in time after the first point in time at which the synchronous update of the document data Doc is executed.

In step S24, the control unit 32 (more specifically, the invariance determination unit 40) acquires a plurality of first hash values generated in the past by using the document data Doc to be requested. Specifically, the invariance determination unit 40 acquires the first hash value included in the document management table 45 of the on-premises side server 16, and acquires the first hash value included in the management information from the cloud side server 18. Thus, the two first hash values stored in the two storage units 34 and 54 are acquired.

In step S25, the invariance determination unit 40 determines whether or not all three hash values obtained in steps S23 and S24 match. In a case where even one of the three hash values does not match (step S25: NO), the processing proceeds to step S31 of FIG. 9 to be described below. Meanwhile, in a case where all three hash values match (step S25: YES), the processing proceeds to the next step S26.

In step S26, after the document data Doc to be requested is read out from the document data group 42, the document management unit 36 performs control for designating the cloud side server 18 as the transmission destination and transmitting the document data Doc. By doing this, the cloud side server 18 receives the document data Doc from the on-premises side server 16 via the network NW.

In step S27, after the document data Doc to be requested is received, the control unit 52 (more specifically, the document management unit 56) of the cloud side server 18 performs control for designating the client terminal 20 as the transmission destination and transmitting the document data Doc. By doing this, the client terminal 20 receives the document data Doc from the cloud side server 18 via the network NW.

Thus, the document data Doc within the on-premises environment 12 is provided to the user after it is confirmed that invariance is maintained. The expression "invariance is maintained" means that the identity of the document data Doc is maintained over time, and means that there is no falsification or damage. Meanwhile, in a case where even one of the three hash values does not match, the data management system 10 operates according to the flowchart of FIG. 9. Steps S31 to S33 of FIG. 9 are executed by the on-premises side server 16, step S34 is executed by the cloud side server 18, and step S35 is executed by the client terminal 20.

In step S31 of FIG. 9, the control unit 32 (more specifically, the invariance determination unit 40) of the on-premises side server 16 specifies a classification pattern (hereinafter, referred to as a "mismatch pattern") indicating the mismatch of the hash values by comparing the set including three hash values with each other. In a case where there are three hash values to be compared, the mismatch pattern is either a pattern in which only one does not match or a pattern in which all the three values do not match.

In step S32, the invariance determination unit 40 determines a cause by which the invariance of the data is impaired from the mismatch pattern specified in step S31. Here, the "invariance of the data is impaired" includes both phenomena of [1] falsification of data and [2] damage of data. This cause is determined according to a determination rule shown in FIG. 10.

The determination rule shown in FIG. 10 describes each determination result for a combination of hash values. In this diagram, the first hash value on the on-premises side is denoted as "HO1", the first hash value on the cloud side is denoted as "HC1", and the regenerated second hash value is denoted as "HO2". The "match" means that the hash value belongs to a group (hereinafter, referred to as a "largest group") of which the number of matched hash values is largest. In contrast, the "mismatch" means that the hash value does not belong to the largest group.

Here, [1] in a case where all the hash values HO1, HC1, and HO2 match, it is determined that these hash values are normal. [2] In a case where only the hash value HO1 does not match, it is determined that the hash value HO1 is falsified or damaged on the on-premises side. [3] In a case where only the hash value HC1 does not match, it is determined that the hash value HC1 is falsified or damaged on the cloud side. [4] In a case where only the hash value HO2 does not match, it is determined that the document data Doc is falsified or damaged on the on-premises side. [5] In a case where the hash values HO1, HC1, and HO2 do not match each other, it is determined that the abnormality is of unknown cause. Although it has been described that the determination is performed by using two first hash values, the determination may be performed by using three, four, or five or more first hash values.

Figure 11:
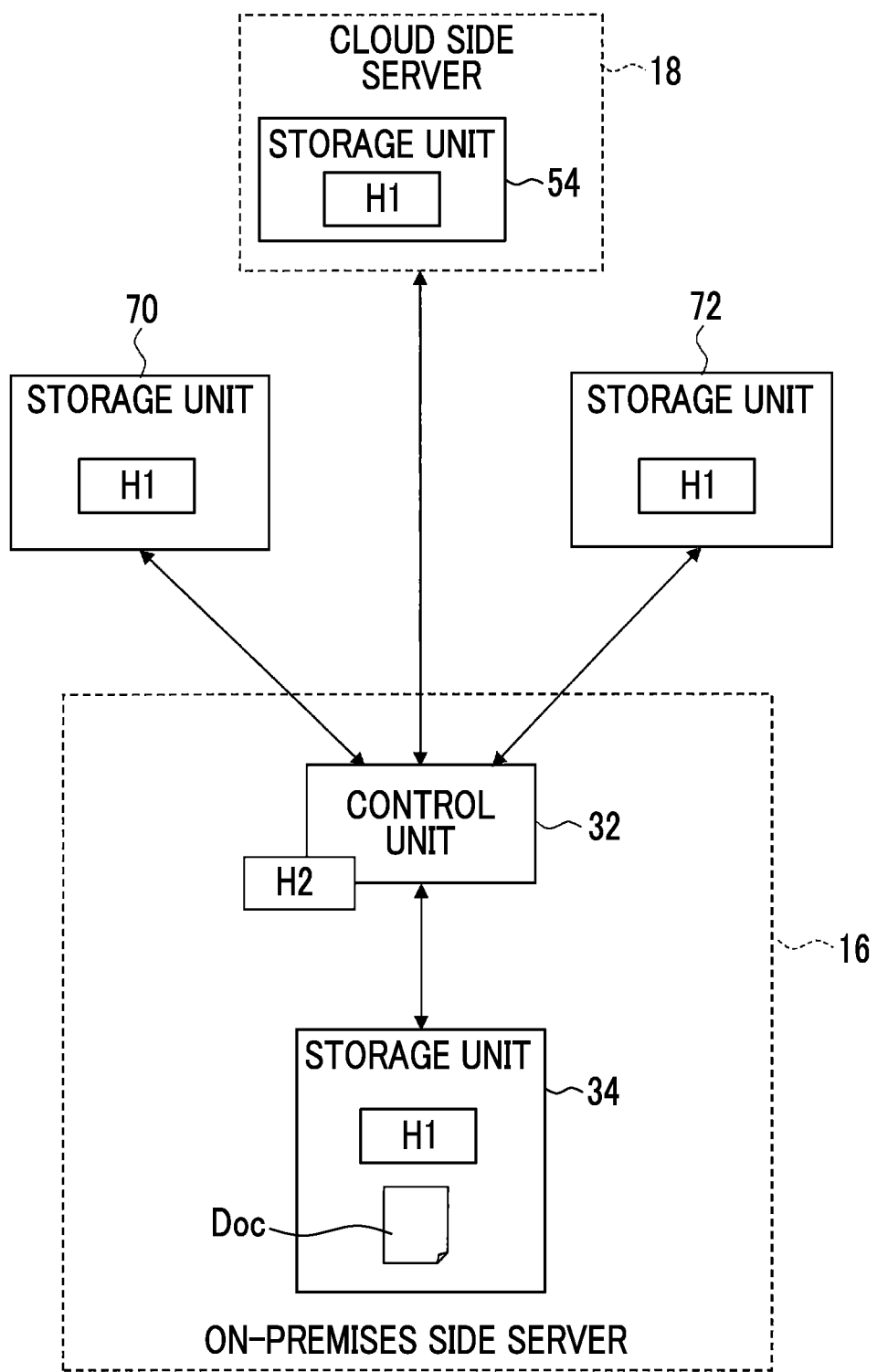
FIG. 11 is a schematic diagram showing a configuration for performing a determination method using four first hash values.

FIG. 11 is a schematic diagram showing a configuration for performing a determination method using four first hash values. In this diagram, "H1" indicates a first hash value, and "H2" indicates a second hash value. Here, the first hash value is stored in other storage units 70 and 72 in addition to the storage unit 34 of the on-premises side server 16 and the storage unit 54 of the cloud side server 18. The storage units 70 and 72 may be storage devices for storing data, or may be memories built in a computer. The storage units 70 and 72 may be provided within the on-premises environment 12 or the cloud environment 14, or may be provided in another network environment.

For example, in a case where the plurality of first hash values is all stored within a single network, and in a case where a failure occurs within the network, the determination of the invariance may not be executed. Therefore, in order to further increase the reliability of this determination, at least one of the plurality of storage units 34, 54, 70, or 72 may be provided within a network different from other storage devices.

Similarly, in a case where both the plurality of first hash values and the document data Doc are stored within a single network, and in a case where the failure occurs within the network, the determination of the invariance may not be executed. Therefore, in order to further increase the reliability of the determination, at least one of the plurality of storage units 34, 54, 70, or 72 may be provided within a network different from the device (that is, the on-premises side server 16) that stores the document data Doc.

In a case where a device that stores the document data Doc and a device that determines invariance are provided within separate networks, since the document data Doc is exchanged over a plurality of networks in a case where this determination is performed, there is a high possibility that the document data is falsified or damaged. Therefore, in order to suppress the invariance of the document data Doc from being impaired in a case where the control unit 32 acquires the document data Doc, the on-premises side server 16 may be identical to the device that stores the document data Doc or may be provided in a network identical to the network of the device.

In a case where the control unit 32 periodically performs the determination of the invariance, since a time is available from a most recent determination time depending on a timing at which the client terminal 20 requests access to the document data Doc, the falsification or damage of the document data Doc may occur within an available period. Therefore, in order to perform the determination at a timing more appropriate for the user who requests the document data Doc, the control unit 32 may perform the determination in response to the reception of the request of the access to the document data Doc from the client terminal 20 different from the on-premises side server 16.

In a case where the determination is performed by using the plurality of first hash values, [1] in a case where the plurality of first hash values match each other, the control unit 32 (more specifically, the invariance determination unit 40) may determine that the invariance of all the first hash values is maintained. [2] In a case where even one of the plurality of first hash values does not match, the control unit 32 may determine that the invariance of the first hash values belonging to the largest group is maintained. [3] In a case where a part of the plurality of first hash values does not match the second hash values, the control unit 32 may determine that the invariance of the part of the first hash values is impaired. [4] In a case where the second hash value does not match the first hash value for which the invariance is determined to be maintained, the control unit 32 may determine that the invariance of the document data Doc is impaired. Thus, the cause by which the invariance of the first and second hash values or the document data Doc is impaired is classified (step S32).

In step S33 of FIG. 9, the control unit 32 (more specifically, the document management unit 36) of the on-premises side server 16 performs control for notifying that the document data Doc to be requested cannot be transmitted. By doing this, the cloud side server 18 receives a notification signal from the on-premises side server 16 via the network NW.

In step S34, the control unit 52 (more specifically, the document management unit 56) of the cloud side server 18 performs control for notifying that the document data Doc to be requested cannot be transmitted.

By doing this, the client terminal 20 receives the notification signal from the cloud side server 18 via the network NW.

In step S35, the output unit 24 of the client terminal 20 outputs a notification indicating that the document data Doc cannot be transmitted to the user. Here, in order to present more useful information for specifying the cause to the user, the output unit 24 displays information related to a device that stores the first hash value or the document data Doc for which the invariance is determined to be impaired on a confirmation screen 80.

Figure 12A:
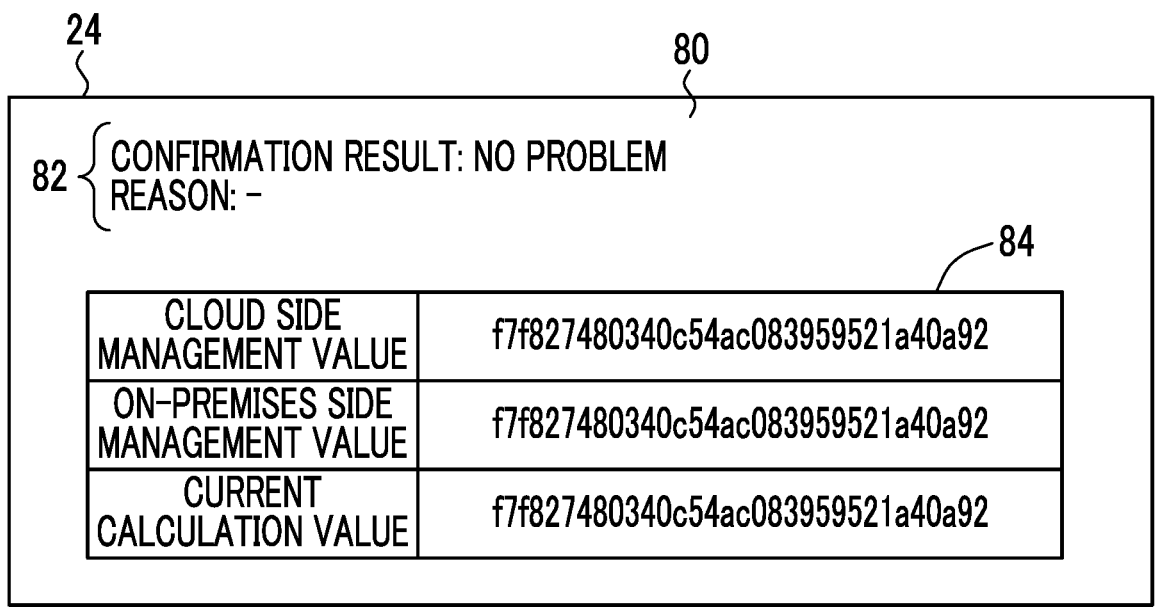
FIGS. 12A and 12B are diagrams showing display examples of a screen using a client terminal.
Figure 12B:
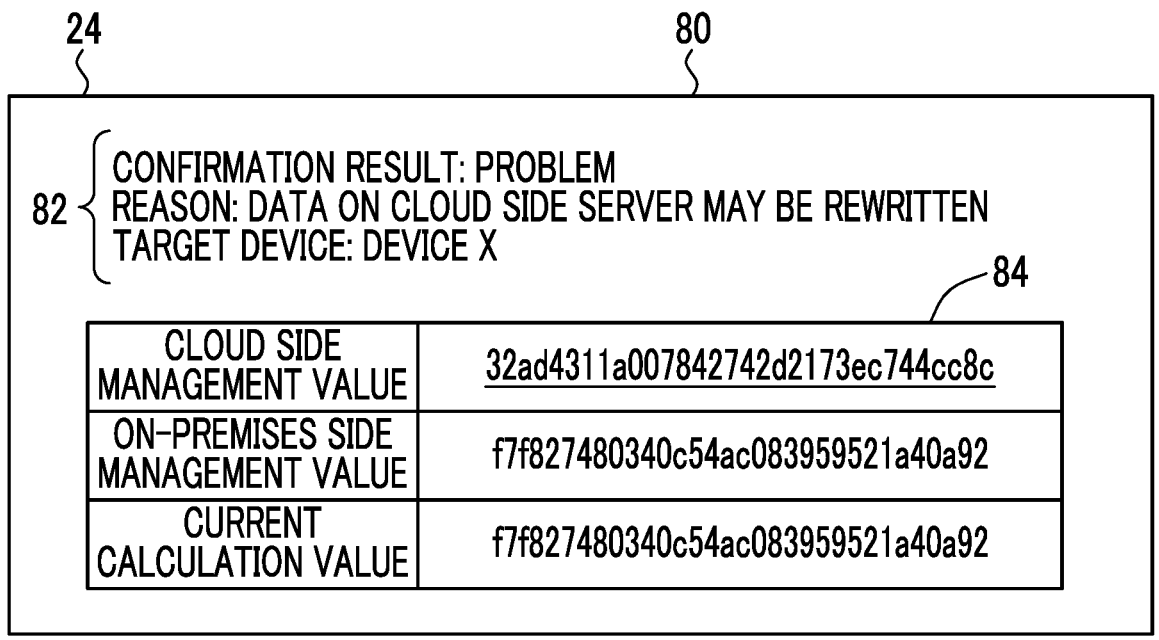

FIGS. 12A and 12B are diagrams showing examples of a display on the confirmation screen 80. More specifically, FIG. 12A shows a case where the client terminal 20 can acquire the document data Doc, and FIG. 12B shows a case where the client terminal 20 cannot acquire the document data Doc. A first column 82 indicating a confirmation result, a reason, and a target device and a second column 84 indicating three hash values are provided within the confirmation screen 80.

The determination result in step S25 of FIG. 8 is displayed in the "confirmation result" within the first column 82. Specifically, in a case where all the three hash values match, "No problem" is displayed, and in a case where any one of the three hash values does not match, "Problem" is displayed. The determination result in step S32 of FIG. 9, that is, the "cause" shown in FIG. 10 is displayed in the "reason" within the first column 82. Device information (for example, a name, an ID, and an administrator of the device) related to the device that stores the first hash value or the document data Doc for which the invariance is determined to be impaired is displayed in the "target device" of the first column 82.

The user can grasp at a glance whether the data is falsified or damaged by visually recognizing the second column 84 on the confirmation screen 80. The user who visually recognizes the first column 82 can be prompted to take an action to cope with the falsification or damage of the data. Thus, the third operation of the data management system 10 ends.

As described above, according to the data management system 10, the data management apparatus, and the data management program, [1] the control unit 32 of the on-premises side server 16 generates the hash value corresponding to the document data Doc to be managed according to the predetermined calculation rule (steps S4 and S23), [2]

the plurality of storage units 34, 54, 70, and 72 stores the first hash values generated by the control unit 32 at the first point in time, respectively (steps S5 and S7), and [3] the control unit 32 performs the determination of the invariance related to the plurality of first hash values or the document data Doc by comparing the sets including the plurality of first hash values read out from the plurality of storage units 34, 54, 70, and 72 and the second hash values regenerated according to the calculation rule at the second point in time later than the first point in time (steps S25, S31, and S32).

As described above, the consistency of the hash values in the different storage units 34, 54, 70, and 72 can be evaluated by comparing the plurality of first hash values with each other, and the consistency of the hash values at different generation point in times can be evaluated by comparing the first hash values and the second hash value. That is, the invariance related to each first hash value through a cross check between the plurality of first hash values and the second hash values can be determined in a state of being separated from the determination result related to the document data Doc. Accordingly, in a case where the hash value stored in the storage device is read out and is used as a comparison value and the invariance of the hash value is impaired, erroneous determination related to the invariance of the document data Doc is suppressed.

MODIFICATION EXAMPLE

It should be noted that the present invention is not limited to the aforementioned exemplary embodiment, and may be freely changed without departing from the gist of the present invention. Alternatively, the respective configurations may be arbitrarily combined as long as no technical inconsistency occurs.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of the operations of the processor is not limited to one described in the flowcharts shown in FIGS. 6 to 9, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data management system comprising:
a management apparatus including a processor; and
a plurality of storage devices,
wherein the processor is configured to generate hash values corresponding to data to be managed according to a predetermined calculation rule,
each of the plurality of storage devices respectively stores a first hash value corresponding to the data and generated by the processor at a first point in time, and
the processor is configured to perform determination of invariance related to the plurality of first hash values or the data stored in the plurality of storage devices by comparing sets including the first hash value read out from each of the plurality of storage devices and a second hash value corresponding to the data and regenerated according to the calculation rule at a second point in time later than the first point in time.

2. The data management system according to claim 1, wherein at least one of the plurality of storage devices is provided within a network different from a network of the other storage devices.

3. The data management system according to claim 1, wherein at least one of the plurality of storage devices is provided within a network different from a network of a device that stores the data.

4. The data management system according to claim 1, wherein the management apparatus is identical to a device that stores the data or is provided within a network identical to a network of the device.

5. The data management system according to claim 1, wherein the determination of the invariance is performed in response to reception of a request for access to the data from a terminal device different from the management apparatus.

6. The data management system according to claim 1, further comprising:
a display device that displays information related to a device that stores the first hash values or the data for which the invariance is determined to be impaired.

7. The data management system according to claim 1, wherein the determination of the invariance includes determination that the invariance of all the first hash values is maintained in a case where the plurality of first hash values match each other.

8. The data management system according to claim 1, wherein the determination of the invariance includes determination that the invariance of the first hash values of which the number of matched hash values is largest is maintained in a case where even one of the plurality of first hash values does not match.

9. The data management system according to claim 1, wherein the determination of the invariance includes determination that the invariance of a part of the first hash values is impaired in a case where the part of the plurality of first hash values do not match the second hash value.

10. The data management system according to claim 1, wherein the determination of the invariance includes determination that the invariance of the data is impaired in a case where the second hash value do not match the first hash values for which the invariance is determined to be maintained.

11. The data management system according to claim 1, wherein the plurality of storage devices comprise a first storage device and a second storage device, and
wherein the processor compares the first hash value stored in the first storage device, the first hash value stored in the second storage device, and the second hash value.

12. The data management system according to claim 11, wherein the first storage device is in an on-premises side server, and
wherein the second storage device is in a cloud side server.

13. A data management apparatus comprising:
a processor configured to
  generate hash values corresponding to data to be managed according to a predetermined calculation rule; and
  perform determination of invariance related to a plurality of first hash values or the data by comparing sets including a first has value corresponding to the data and generated at a first point in time and is stored in each of a plurality of storage devices and a second hash value corresponding to the data and regenerated according to the calculation rule at a second point in time later than the first point in time.

14. A non-transitory computer-readable medium storing data management program causing a processor to execute a process, the process comprising:
  generating hash values corresponding to data to be managed according to a predetermined calculation rule; and
  performing determination of invariance related to a plurality of first hash values or the data by comparing sets including a first has value corresponding to the data and generated at a first point in time and is stored in each of a plurality of storage devices and a second hash value corresponding to the data and regenerated according to the calculation rule at a second point in time later than the first point in time.

* * * * *